US009849792B2

(12) United States Patent
Kimura et al.

(10) Patent No.: US 9,849,792 B2
(45) Date of Patent: Dec. 26, 2017

(54) VEHICLE

(75) Inventors: Kenji Kimura, Miyoshi (JP); Akihiro Sato, Nagoya (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 561 days.

(21) Appl. No.: 14/395,104

(22) PCT Filed: Apr. 20, 2012

(86) PCT No.: PCT/JP2012/002757
§ 371 (c)(1),
(2), (4) Date: Dec. 1, 2014

(87) PCT Pub. No.: WO2013/157049
PCT Pub. Date: Oct. 24, 2013

(65) Prior Publication Data
US 2015/0097425 A1 Apr. 9, 2015

(51) Int. Cl.
*B60K 1/04* (2006.01)
*B60L 11/18* (2006.01)
(Continued)

(52) U.S. Cl.
CPC .............. *B60L 11/18* (2013.01); *B60K 1/04* (2013.01); *B60K 6/28* (2013.01); *B60L 1/02* (2013.01);
(Continued)

(58) Field of Classification Search
CPC .... B60K 1/04; B60K 6/28; B60K 2001/0416; B60K 2001/0433; B60K 2001/0438
See application file for complete search history.

(56) References Cited

U.S. PATENT DOCUMENTS 5,318,142 A * 6/1994 Bates ................. B60K 6/28
180/65.245
5,373,910 A * 12/1994 Nixon ................. B60K 1/04
104/34
(Continued)

FOREIGN PATENT DOCUMENTS

JP 10-285800 A 10/1998
JP 2007-008443 A 1/2007
(Continued)

OTHER PUBLICATIONS

International Search Report for PCT/JP2012/002757 dated Jun. 12, 2012.

*Primary Examiner* — Frank B Vanaman
(74) *Attorney, Agent, or Firm* — Sughrue Mion, PLLC

(57) ABSTRACT

A vehicle includes a motor serving as a driving source configured to run the vehicle, and a high-power and high-capacity assembled batteries, each of the assembled batteries being formed to include secondary batteries configured to supply an electric power to the motor, the secondary batteries of the assembled batteries being housed in different cases. The high-power and high-capacity assembled batteries are arranged around a luggage space located in a rearward portion of the vehicle. The high-power assembled battery is chargeable and dischargeable with a current larger than a current in the high-capacity assembled battery. The high-capacity assembled battery has an energy capacity larger than an energy capacity of the high-power assembled battery. The high-capacity assembled battery is arranged above or below the high-power assembled battery in the vehicle, and at least a portion of the high-capacity assembled battery protrudes from the high-power assembled battery rearward in the vehicle.

8 Claims, 9 Drawing Sheets

(51) Int. Cl.
*B60K 6/28* (2007.10)
*H01M 2/10* (2006.01)
*H01M 16/00* (2006.01)
*B60L 1/02* (2006.01)
*B60L 3/00* (2006.01)
*B60L 7/14* (2006.01)
*B60L 11/00* (2006.01)
*B60L 11/14* (2006.01)

(52) U.S. Cl.
CPC ............ *B60L 3/0007* (2013.01); *B60L 7/14* (2013.01); *B60L 11/005* (2013.01); *B60L 11/14* (2013.01); *B60L 11/1864* (2013.01); *B60L 11/1874* (2013.01); *B60L 11/1875* (2013.01); *B60L 11/1877* (2013.01); *H01M 2/1083* (2013.01); *H01M 16/00* (2013.01); *B60K 2001/0416* (2013.01); *B60L 2210/40* (2013.01); *B60L 2240/545* (2013.01); *B60L 2240/549* (2013.01); *B60Y 2400/114* (2013.01); *H01M 2/1077* (2013.01); *H01M 2220/20* (2013.01); *Y02T 10/6278* (2013.01); *Y02T 10/70* (2013.01); *Y02T 10/7005* (2013.01); *Y02T 10/7022* (2013.01); *Y02T 10/7061* (2013.01); *Y02T 10/7077* (2013.01); *Y02T 10/7241* (2013.01)

(56) References Cited

U.S. PATENT DOCUMENTS

| | | | |
|---|---|---|---|
| 6,345,677 B1* | 2/2002 | Eckersley | B60K 1/04 180/68.5 |
| 7,924,562 B2 | 4/2011 | Soma et al. | |
| 2002/0145404 A1* | 10/2002 | Dasgupta | H02J 7/0013 320/116 |
| 2004/0079569 A1* | 4/2004 | Awakawa | B60K 1/04 180/68.5 |
| 2008/0196957 A1 | 8/2008 | Koike et al. | |
| 2008/0245587 A1* | 10/2008 | Sastry | B60K 6/442 180/65.29 |
| 2008/0274397 A1* | 11/2008 | Watanabe | B60K 1/04 429/99 |
| 2009/0141447 A1 | 6/2009 | Soma et al. | |
| 2010/0101881 A1* | 4/2010 | Yoda | B60K 1/04 180/68.5 |

FOREIGN PATENT DOCUMENTS

| | | |
|---|---|---|
| JP | 2007-311290 A | 11/2007 |
| JP | 2008-091188 A | 4/2008 |
| JP | 2008-258055 A | 10/2008 |
| JP | 2009-240094 A | 10/2009 |

* cited by examiner

VEHICLE

CROSS REFERENCE TO RELATED APPLICATIONS

This application is a National Stage of International Application No. PCT/JP2012/002757 filed Apr. 20, 2012, the contents of all of which are incorporated herein by reference in their entirety.

TECHNICAL FIELD

The present invention relates to a vehicle including a plurality of assembled batteries having different characteristics.

BACKGROUND ART

Patent Document 1 has described a structure for use in a vehicle including a capacitor and a secondary battery in which the secondary battery is arranged above the capacitor or such a structure in which the capacitor is arranged above the secondary battery. Patent Document 2 has described a structure in which a battery is arranged in a trunk room.

PRIOR ART DOCUMENTS

Patent Documents

[Patent Document 1] Japanese Patent Laid-Open No. 2007-311290
[Patent Document 2] Japanese Patent Laid-Open No. 2007-008443

DISCLOSURE OF THE INVENTION

Problems to be Solved by the Invention

When two secondary batteries having different characteristics are arranged around the trunk room, an external force applied to the trunk room upon collision of the vehicle may also be applied to the two secondary batteries having the different characteristics. The application of the external force to the two secondary batteries may make the two secondary batteries unusable.

It has been proposed that, when the external force is applied to the trunk room upon collision of the vehicle, only one of the two secondary batteries having the different characteristics can be protected. The techniques described in Patent Documents 1 and 2, however, do not give any consideration of which of the secondary batteries is preferably protected.

Means for Solving the Problems

According to an aspect, the present invention provides a vehicle including a motor serving as a driving source configured to run a vehicle, and a high-power assembled battery and a high-capacity assembled battery, each of the assembled batteries being formed to include secondary batteries configured to supply an electric power to the motor, the secondary batteries of each of the assembled batteries being housed in different cases. The high-power assembled battery and the high-capacity assembled battery are arranged around a luggage space located in a rearward portion of the vehicle. The high-power assembled battery is chargeable and dischargeable with a current larger than a current in the high-capacity assembled battery. The high-capacity assembled battery has an energy capacity larger than an energy capacity of the high-power assembled battery. The high-capacity assembled battery is arranged above or below the high-power assembled battery in the vehicle, and at least a portion of the high-capacity assembled battery protrudes from the high-power assembled battery rearward in the vehicle.

In the vehicle of the present invention, both the high-power assembled battery and the high-capacity assembled battery can be mounted to achieve the running performance of the vehicle with the high-power assembled battery and to ensure the running distance of the vehicle with the high-capacity assembled battery. Each of the high-power assembled battery and the high-capacity assembled battery can be controlled to have a desired relationship between the running performance and the running distance to enhance the commercial value of the vehicle.

Since the luggage space is provided in the rearward portion of the vehicle, an external force produced upon collision of the rearward portion of the vehicle acts on the luggage space. When the high-power assembled battery and the high-capacity assembled battery are arranged around the luggage space, the external force may be applied to both the high-power assembled battery and the high-capacity assembled battery depending on the positions of the high-power assembled battery and the high-capacity assembled battery.

In the present invention, at least the portion of the high-capacity assembled battery protrudes from the high-power assembled battery rearward in the vehicle. This arrangement may cause the external force produced upon collision of the rearward portion of the vehicle to be applied to the high-capacity assembled battery. Since the high-power assembled battery is arranged forward of the high-capacity assembled battery in the vehicle, the application of the external force to the high-power assembled battery can be prevented. When the external force is applied to the high-capacity assembled battery, the high-capacity assembled battery can be deformed to absorb the external force to further prevent the application of the external force to the high-power assembled battery.

When the external force acts on the high-capacity assembled battery, the high-capacity assembled battery may be displaced forward in the vehicle. According to the present invention, since the high-capacity assembled battery is arranged above or below the high-power assembled battery in the vehicle, the high-capacity assembled battery can be prevented from colliding with the high-power assembled battery even when the high-capacity assembled battery is displaced forward in the vehicle. In other words, in the present invention, even when the external force is applied to the high-capacity assembled battery, the high-capacity assembled battery is simply displaced at a position separate from the high-power assembled battery. This can prevent the external force from acting on the high-power assembled battery through the high-capacity assembled battery, so that the high-power assembled battery can be protected.

In the vehicle on which the high-power assembled battery and the high-capacity assembled battery are mounted, the protection of the high-power assembled battery is preferable to the protection of the high-capacity assembled battery. The high-power assembled battery can be charged and discharged with a current larger than that in the high-capacity assembled battery. In other words, when supplying the electric power supply to the motor to run the vehicle, the high-power assembled battery can supply the electric power higher than that of the high-capacity assembled battery to the motor. Thus, the use of the high-power assembled battery can easily satisfy the output required of the vehicle.

When the motor is used to produce regenerative electric power in braking of the vehicle, the high-power assembled battery can store the electric power (regenerative electric power) higher than that in the high-capacity assembled battery. Thus, the high-power assembled battery can be used to obtain the regenerative electric power with no waste.

As described above, the high-power assembled battery is better than the high-capacity assembled battery in achieving the running performance of the vehicle, and the protection of the high-power assembled battery is preferable to the protection of the high-capacity assembled battery. In the present invention, the configuration described above can protect the high-power assembled battery from the external force to achieve the running performance of the vehicle.

When the high-power assembled battery and the high-capacity assembled battery have an equal temperature, the electric power during charge and discharge of the high-power assembled battery is higher than the electric power during charge and discharge of the high-capacity assembled battery regardless of the temperature. In the high-power assembled battery and the high-capacity assembled battery each formed of secondary batteries, the electric power during charge and discharge tends to be reduced as the temperature drops. Even when the temperature drops, the electric power during charge and discharge of the high-power assembled battery is higher than the electric power during charge and discharge of the high-capacity assembled battery.

As described above, the high-power assembled battery is preferably protected upon collision of the rearward portion of the vehicle. The protection of the high-power assembled battery can assist in achieving the running performance of the vehicle when the vehicle is in a low-temperature environment. For example, when supplying the electric power to the motor to run the vehicle, the use of the high-power assembled battery can be more likely to facilitate the supply of the electric power to the motor to achieve the running of the vehicle in the low-temperature environment. When the motor produces regenerative electric power, the regenerative electric power is stored more reliably by using the high-power assembled battery in the low-temperature environment.

For starting the engine, the use of the high-power assembled battery is preferable, and the protection of the high-power assembled battery is advantageous as described above. The start of the engine requires an electric power equal to or higher than a predetermined level. The electric powers output from the high-power assembled battery and the high-capacity assembled battery are reduced in the low-temperature environment, but the electric power output from the high-power assembled battery is higher than the electric power output from the high-capacity assembled battery. The electric power output from the high-power assembled battery is likely to be higher than the electric power for starting the engine in the low-temperature environment, so that the engine can be started reliably.

If the high-capacity assembled battery is protected rather than the high-power assembled battery, a problem described below may occur. Since the electric power output from the high-capacity assembled battery is lower than the electric power output from the high-power assembled battery, the engine may not be able to be started again after the engine is stopped when only the high-capacity assembled battery is left. If the engine is not stopped, the restart of the engine is not required. If the engine is continuously operated without being stopped, however, the fuel economy is reduced.

For example when the vehicle is run with the engine or the high-capacity assembled battery, the high-power assembled battery can supply the electric power to the motor in accordance with an output required of the vehicle. The high-power assembled battery can be discharged with a current larger than that in the high-capacity assembled battery and can ensure an instantaneous output. When the output required of the vehicle is higher than the output from the engine or the high-capacity assembled battery, the output from the high-power assembled battery can be used to compensate for the insufficient output. This can run the vehicle in accordance with the pressing of an accelerator pedal to enhance the drivability.

The high-capacity assembled battery can supply the electric power to the motor to run the vehicle, for example when the engine is not operated. Since the high-capacity assembled battery has the energy capacity larger than that of the high-power assembled battery, the output from the high-capacity assembled battery can be used to run the vehicle continuously. This can suppress the operation of the engine to increase the fuel economy. In the vehicle with no engine, the output from the high-capacity assembled battery can be used mainly as the energy for running the vehicle.

The high-capacity assembled battery can be arranged below and rearward of the high-power assembled battery in the vehicle. Since the high-power assembled battery is arranged forward of the high-capacity assembled battery in the vehicle in this configuration, the external force produced upon collision of the rearward portion of the vehicle can be prevented from being applied to the high-power assembled battery as described above. The external force may be applied only to an upper portion of the vehicle depending on the point of the collision in the rearward portion of the vehicle. Since the high-capacity assembled battery is arranged below the high-power assembled battery in the vehicle, the external force may also not be applied to the high-capacity assembled battery depending on the situation of the collision of the vehicle. In this case, both the high-capacity assembled battery and the high-power assembled battery can be protected.

In an exemplary configuration in which the high-capacity assembled battery is arranged below and rearward of the high-power assembled battery in the vehicle, the high-power assembled battery can be arranged at a position along a back face of a seat adjacent to the luggage space on a floor panel of the vehicle. The arrangement of the high-power assembled battery at the position along the back face of the seat enables the arrangement of the high-power assembled battery at the position farthest from the rearward portion of the vehicle around the luggage space. This can facilitate the prevention of the application of the external force to the high-power assembled battery upon collision of the rearward portion of the vehicle.

The high-capacity assembled battery can be arranged in a recessed portion located below the luggage space and formed in the floor panel. The recessed portion formed in the floor panel allows the space located above the recessed portion to be used as the luggage space. The placement of the high-capacity assembled battery in the recessed portion of the floor panel can prevent the high-capacity assembled battery from limiting the luggage space. The arrangement of the high-power assembled battery at the position along the back face of the seat and the high-capacity assembled battery in the recessed portion of the floor panel can minimize a reduction in size of the luggage space due to the placement of the high-power assembled battery and the high-capacity assembled battery.

When the high-power assembled battery is arranged above the high-capacity assembled battery, a bottom face of the high-power assembled battery can be entirely opposite to an upper face of the high-capacity assembled battery in an up-down direction of the vehicle. Since the high-capacity assembled battery protrudes from the high-power assembled battery rearward in the vehicle as described above, the arrangement of the entire bottom face of the high-power assembled battery opposite to the upper face of the high-capacity assembled battery can increase the size of the high-capacity assembled battery. Specifically, the number of the secondary batteries constituting the high-capacity assembled battery can be increased to increase the capacity (full charge capacity) of the high-capacity assembled battery. The increased capacity of the high-capacity assembled battery can extend the running distance of the vehicle in running with the high-capacity assembled battery.

The high-power assembled battery can be formed of a plurality of secondary batteries connected electrically in series. For example, a square-type battery can be used as the secondary battery. The high-capacity assembled battery can be formed of a plurality of secondary batteries connected electrically in parallel. For example, a cylinder-type battery can be used as the secondary battery.

MODE FOR CARRYING OUT THE INVENTION

An embodiment of the present invention will hereinafter be described.

Embodiment 1

Figure 1:
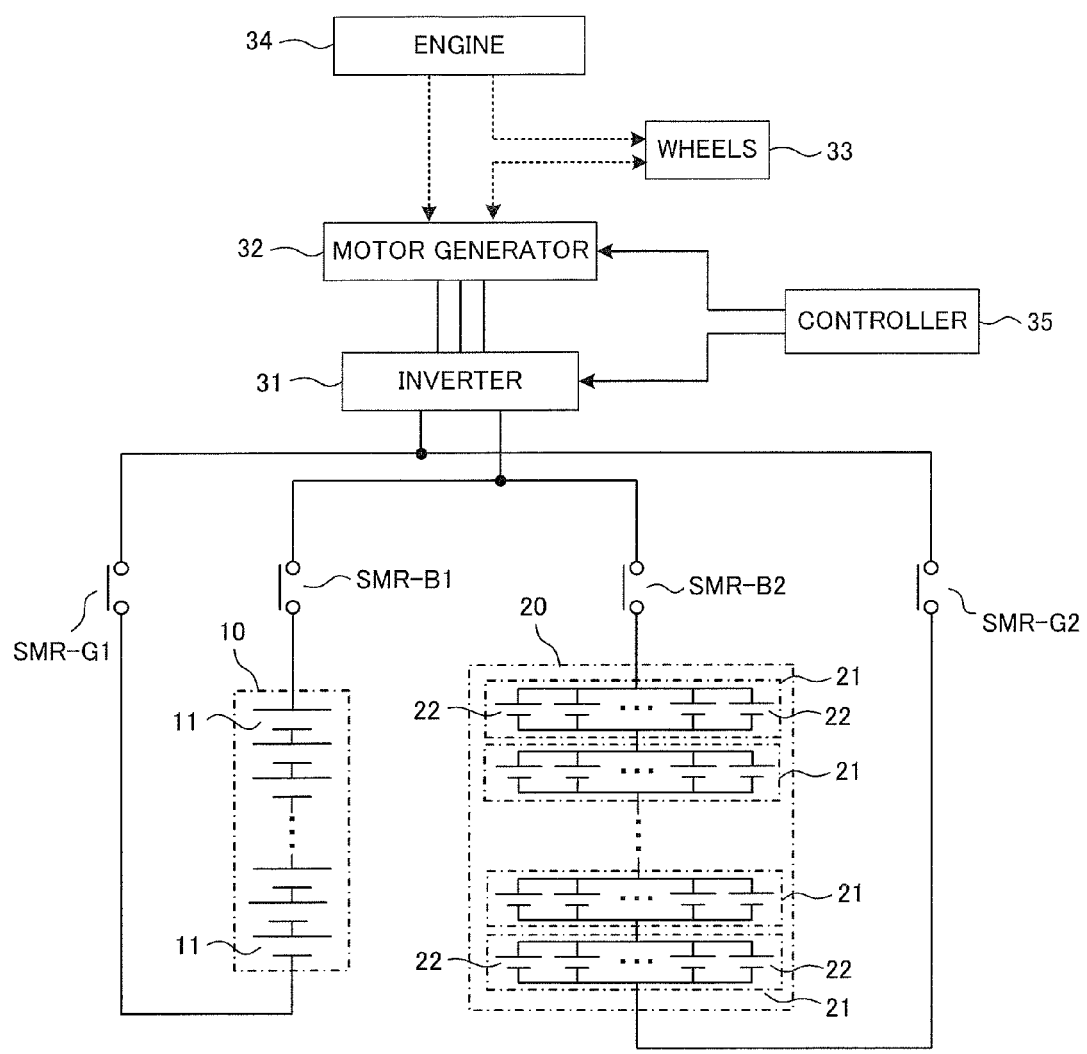
FIG. 1 is a diagram showing the configuration of a battery system.

A battery system according to the present embodiment will be described with reference to FIG. 1. FIG. 1 is a schematic diagram showing the configuration of the battery system. The battery system of the present embodiment is mounted on a vehicle. In FIG. 1, connections indicated by solid lines represent electrical connections, and connections indicated by dotted lines represent mechanical connections.

The battery system has a high-power assembled battery 10 and a high-capacity assembled battery 20 connected electrically in parallel. The high-power assembled battery 10 is connected to an inverter 31 through system main relays SMR-B1 and SMR-G1. The high-capacity assembled battery 20 is connected to the inverter 31 through system main relays SMR-B2 and SMR-G2. The inverter 31 converts a DC power supplied from each of the assembled batteries 10 and 20 into an AC power.

A motor generator 32 (AC motor) is connected to the inverter 31 and receives the AC power supplied from the inverter 31 to produce a kinetic energy for use in running the vehicle. The motor generator 32 is connected to wheels 33. An engine 34 is connected to the wheels 33, and a kinetic energy produced by the engine 34 is transferred to the wheels 33. Thus, the vehicle can be run with the outputs from the assembled batteries 10, 20 and the engine 34. The engine 34 can be started by using the output from the high-power assembled battery 10.

For decelerating or stopping the vehicle, the motor generator 32 converts a kinetic energy generated in braking of the vehicle into an electric energy (AC power). The inverter 31 converts the AC power produced by the motor generator 32 into a DC power and outputs the DC power to the assembled batteries 10 and 20. The assembled batteries 10 and 20 can store the regenerative electric power.

A controller 35 outputs a control signal to each of the inverter 31 and the motor generator 32 to control the driving of the inverter 31 and the motor generator 32. The controller 35 also outputs a control signal to each of the system main relays SMR-B1, SMR-B2, SMR-G1, and SMR-G2 to switch each of the system main relays SMR-B1, SMR-B2, SMR-G1, and SMR-G2 between ON and OFF.

While the system main relays SMR-B1 and SMR-G1 are ON, the high-power assembled battery 10 can be charged and discharged. While the system main relays SMR-B1 and SMR-G1 are OFF, the high-power assembled battery 10 is not charged or discharged. While the system main relays SMR-B2 and SMR-G2 are ON, the high-capacity assembled battery 20 can be charged and discharged. While the system main relays SMR-B2 and SMR-G2 are OFF, the high-capacity assembled battery 20 is not charged or discharged.

Although the assembled batteries 10 and 20 are connected to the inverter 31 in the present embodiment, the present invention is not limited thereto. Specifically, a step-up circuit can be provided on the current path between at least one of the assembled batteries 10 and 20 and the inverter 31. The step-up circuit increases the voltage output from at least one of the assembled batteries 10 and 20 and supply the electric power at the increased voltage to the inverter 31.

The vehicle in the present embodiment includes not only the assembled batteries 10 and 20 but also the engine 34 as the power sources for running the vehicle. The engine 34 may be one which uses gasoline, a diesel fuel, or a biofuel.

The vehicle according to the present embodiment can be run by using only the outputs from the high-power assembled battery 10 and the high-capacity assembled battery 20. This running mode is referred to as an EV (Electric Vehicle) running mode. For example, the vehicle can be run by discharging the high-capacity assembled battery 20 from near 100% to near 0% SOC (State of Charge). The SOC refers to the proportion of the present charge capacity to the full charge capacity. After the SOC of the high-capacity assembled battery 20 reaches near 0%, an external power source can be used to charge the high-capacity assembled battery 20. A commercial power source can be used as the external power source, for example. When the commercial power source is used, a charger is required to convert an AC power into a DC power.

When a driver presses an accelerator pedal to increase the output required of the vehicle in the EV running mode, not only the output from the high-capacity assembled battery 20 but also the output from the high-power assembled battery 10 can be used to run the vehicle. The combinational use of the high-capacity assembled battery 20 and the high-power assembled battery 10 can provide the battery output in accordance with the pressing of the accelerator pedal to enhance the drivability.

After the SOC of the high-capacity assembled battery 20 reaches near 0%, the vehicle can be run by using the high-power assembled battery 10 and the engine 34 in combination. This running mode is referred to as an HV (Hybrid Vehicle) running mode. In the HV running mode, not only the output from the engine 34 but also the output from the high-power assembled battery 10 can be used to run the vehicle. The combinational use of the engine 34 and the high-power assembled battery 10 can provide the output in accordance with the pressing of the accelerator pedal to enhance the drivability.

In the HV running mode, the charge and discharge of the high-power assembled battery 10 can be controlled, for example, such that the SOC of the high-power assembled battery 10 is changed on the basis of a predefined reference SOC. For example, when the SOC of the high-power assembled battery 10 is higher than the reference SOC, the high-power assembled battery 10 can be discharged to bring the SOC of the high-power assembled battery 10 closer to the reference SOC. Alternatively, when the SOC of the high-power assembled battery 10 is lower than the reference SOC, the high-power assembled battery 10 can be charged to bring the SOC of the high-power assembled battery 10 closer to the reference SOC.

In the HV running mode, not only the high-power assembled battery 10 but also the high-capacity assembled battery 20 can be used. For example, part of the capacity of the high-capacity assembled battery 20 is reserved at the termination of the running in the EV running mode, and the high-capacity assembled battery 20 can be discharged in the HV running mode. In addition, the regenerative electric power may be stored in the high-capacity assembled battery 20 in the HV running mode.

As described above, the high-capacity assembled battery 20 can be used mainly in the EV running mode, and the high-power assembled battery 10 can be used mainly in the HV running mode. The main use of the high-capacity assembled battery 20 in the EV running mode means the following two cases.

Firstly, it means that the frequency of use of the high-capacity assembled battery 20 is higher than that of the high-power assembled battery 10 in the EV running mode. Secondly, when the high-capacity assembled battery 20 and the high-power assembled battery 10 are used in combination in the EV running mode, the main use of the high-capacity assembled battery 20 means that the proportion of the electric power output therefrom in the total electric power used in running of the vehicle is higher than the proportion of the electric power output from the high-power assembled battery 10. The total electric power refers to an electric power used for a predetermined running time period or a predetermined running distance, rather than an instantaneous electric power.

Figure 2:
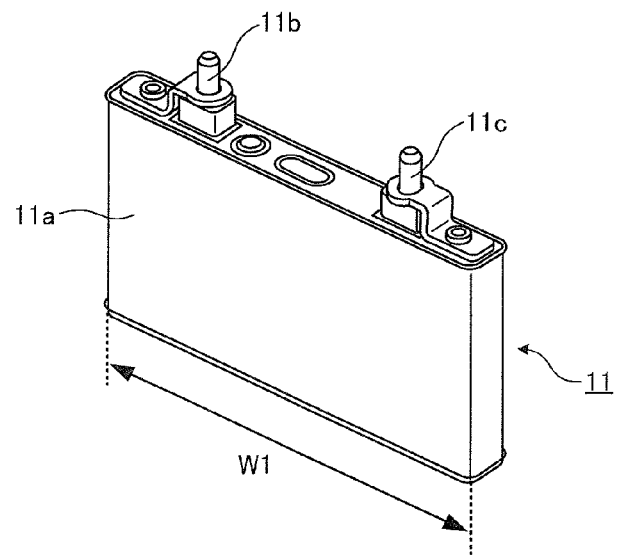
FIG. 2 is an external view of a cell (secondary battery) used in a high-power assembled battery.

As shown in FIG. 1, the high-power assembled battery 10 has a plurality of cells 11 connected electrically in series. A secondary battery such as a nickel metal hydride battery or a lithium-ion battery is used as the cell 11. The number of the cells 11 constituting the high-power assembled battery 10 can be set as appropriate by taking account of the output required of the high-power assembled battery 10 and the like. As shown in FIG. 2, a so-called square-type cell can be used as the cell 11. The square-type cell refers to a cell having an outer shape conforming to a rectangle.

In FIG. 2, the cell 11 has a battery case 11a conforming to a rectangle. The battery case 11a accommodates a power-generating element capable of charge and discharge. The power-generating element has a positive electrode component, a negative electrode component, and a separator arranged between the positive electrode component and the negative electrode component. The positive electrode component has a collector plate and a positive electrode active material layer formed on a surface of the collector plate. The negative electrode component has a collector plate and a negative electrode active material layer formed on a surface of the collector plate. Each of the separator, the positive electrode active material layer, and the negative electrode active material layer contains an electrolytic solution. A solid electrolyte may be used instead of the electrolytic solution.

A positive electrode terminal 11b and a negative electrode terminal 11c are arranged on an upper face of the battery case 11a. The positive electrode terminal 11b is connected electrically to the positive electrode component of the power-generating element, and the negative electrode terminal 11c is connected electrically to the negative electrode component of the power-generating element.

Figure 3:
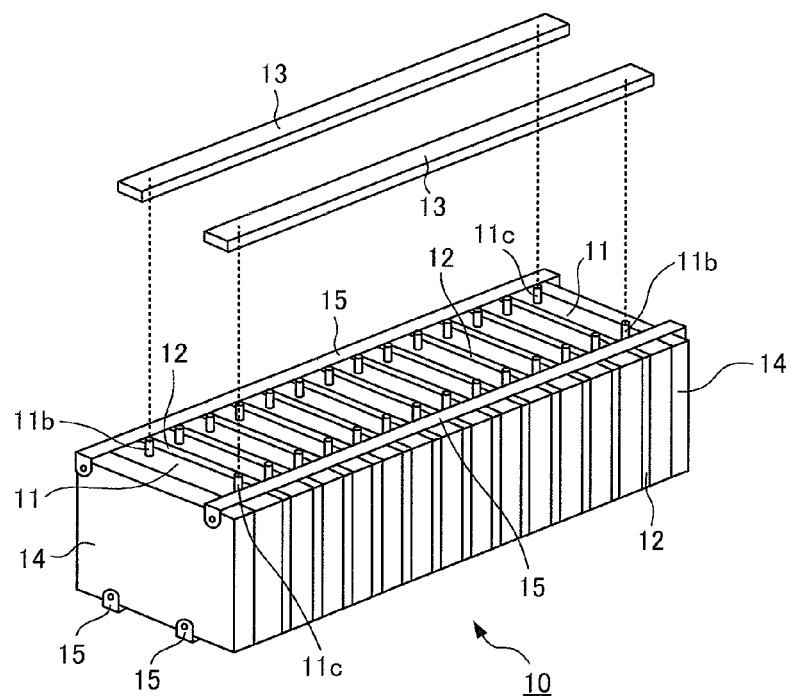
FIG. 3 is an external view of the high-power assembled battery.

As shown in FIG. 3, the high-power assembled battery 10 has the plurality of cells 11 arranged side by side along one direction. For mounting the high-power assembled battery 10 on the vehicle, the configuration shown in FIG. 3 is covered with a case (not shown). Thus, the high-power assembled battery 10 is formed of the configuration shown in FIG. 3 and the case. A partitioning plate 12 is arranged between adjacent two of the cells 11. The partitioning plate 12 can be made of an insulating material such as resin to establish the insulating state between the two cells 11.

The use of the partitioning plate 12 can provide space on an outer face of the cell 11. Specifically, the partitioning plate 12 can have a protruding portion which protrudes toward the cell 11, and the tip of the protruding portion can be brought into contact with the cell 11 to provide the space between the partitioning plate 12 and the cell 11. Air used for adjusting the temperature of the cell 11 can be moved through the space.

When the cell 11 generates heat due to charge and discharge or the like, air for cooling can be introduced into the space provided between the partitioning plate 12 and the cell 11. The air for cooling can exchange heat with the cell 11 to suppress a rise in temperature of the cell 11. Alternatively, when the cell 11 is excessively cooled, air for heating can be introduced into the space provided between the partitioning plate 12 and the cell 11. The air for heating can exchange heat with the cell 11 to suppress a drop in temperature of the cell 11.

The cell (secondary battery) 11 is more sensitive to temperature than an electric double layer capacitor. The air for cooling or heating can be used to maintain the temperature of the cell 11 within a predefined temperature range to avoid reduced input/output performance of the cell 11. For example, the air in a riding space of the vehicle can be used as the air for adjusting the temperature of the cell 11. The air in the riding space has a temperature set by an air-conditioner or the like mounted on the vehicle and appropriate for adjusting the temperature of the cell 11. Thus, the air in the riding space can be directed to the cell 11 to easily perform the temperature adjustment for the cell 11.

The plurality of cells 11 are connected electrically in series through two bus bar modules 13. The bus bar module 13 has a plurality of bus bars and a holder for holding the plurality of bus bars. The bus bar is made of a conductive material and is connected to the positive electrode terminal 11b of one of two adjacent cells 11 and the negative electrode terminal 11c of the other cell 11. The holder is formed of an insulating material such as resin.

A pair of end plates 14 are arranged at both ends of the high-power assembled battery 10 in the direction along which the plurality of cells 11 are arranged. Restraint bands 15 extending in the direction of the arrangement of the plurality of cells 11 are connected to the pair of end plates 14. This can apply a restraint force to the plurality of cells 11. The restraint force refers to a force which tightly holds each of the cells 11 in the direction of the arrangement of the plurality of cells 11. The restraint force applied to the cells 11 can suppress displacement or expansion of the cell 11.

In the present embodiment, two restraint bands 15 are arranged on an upper face of the high-power assembled battery 10 and two restraint bands 15 are arranged on a lower face of the high-power assembled battery 10. The number of the restraint bands 15 can be set as appropriate. It is only required that the restraint bands 15 and the end plates 14 can be used to apply the restraint force to the cells 11. Alternatively, the restraint force may not be applied to the cells 11, and the end plates 14 and the restraint bands 15 may be omitted.

Although the plurality of cells 11 are arranged along one direction in the present embodiment, the present invention is not limited thereto. For example, a plurality of cells may be used to constitute a single battery module, and a plurality of such battery modules may be arranged along one direction. Each of the battery modules can include the cells connected electrically in series. The plurality of battery modules may be connected electrically in series to constitute the high-power assembled battery 10.

As shown in FIG. 1, the high-capacity assembled battery 20 has a plurality of battery blocks 21 connected electrically in series. Each of the battery blocks 21 has a plurality of cells 22 connected electrically in parallel. The number of the battery blocks 21 and the number of the cells 22 included in each of the battery blocks 21 can be set as appropriate in view of the output required of the high-capacity assembled battery 20, the capacity thereof or the like.

Although the plurality of cells 22 are connected electrically in parallel in the battery block 21 of the present embodiment, the present invention is not limited thereto. Specifically, a battery module may be provided by connecting a plurality of cells 22 electrically in series, and then a plurality of such battery modules may be connected electrically in parallel to constitute the battery block 21.

Figure 4:
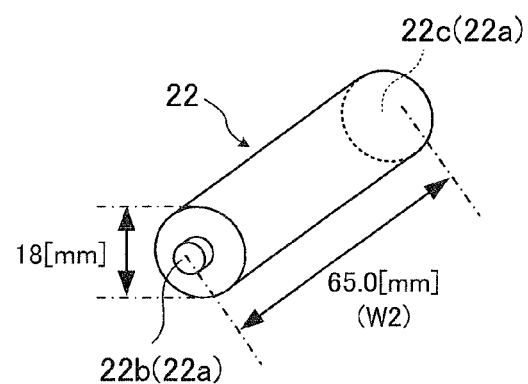
FIG. 4 is an external view of a cell (secondary battery) used in a high-capacity assembled battery.

The cell 22 is a secondary battery such as a nickel metal hydride battery or a lithium-ion battery. As shown in FIG. 4, a so-called cylinder-type cell can be used as the cell 22. The cylinder-type cell refers to a cell having an outer shape conforming to a cylinder.

As shown in FIG. 4, the cylinder-type cell 22 has a cylindrical battery case 22a. The battery case 22a accommodates a power-generating element. The power-generating element in the cell 22 has constituent members similar to the constituent members of the power-generating element in the cell 11.

A positive electrode terminal 22b and a negative electrode terminal 22c are provided at both ends of the cell 22 in a longitudinal direction. The positive electrode terminal 22b and the negative electrode terminal 22c form part of the battery case 22a. The positive electrode terminal 22b and the negative electrode terminal 22c are insulated from each other. The positive electrode terminal 22b is connected electrically to a positive electrode component of the power-generating element, and the negative electrode terminal 22c is connected electrically to a negative electrode component of the power-generating element. The cell 22 of the present embodiment is a battery called 18650 type having a diameter of 18 mm and a length of 65.0 mm. The cell 22 may be a cell 22 having dimensions different from those of the 18650 type.

The size of the square-type cell 11 is larger than the size of the cylinder-type cell 22. The size of each of the cells 11 and 22 means the size of the portion having the largest dimension. Specifically, in the configuration of the cell 11 shown in FIG. 2, a length W1 is used as the size of the cell 11. In the configuration of the cell 22 shown in FIG. 4, a length W2 is used as the size of the cell 22. The length W1 is larger than the length W2.

Figure 5:
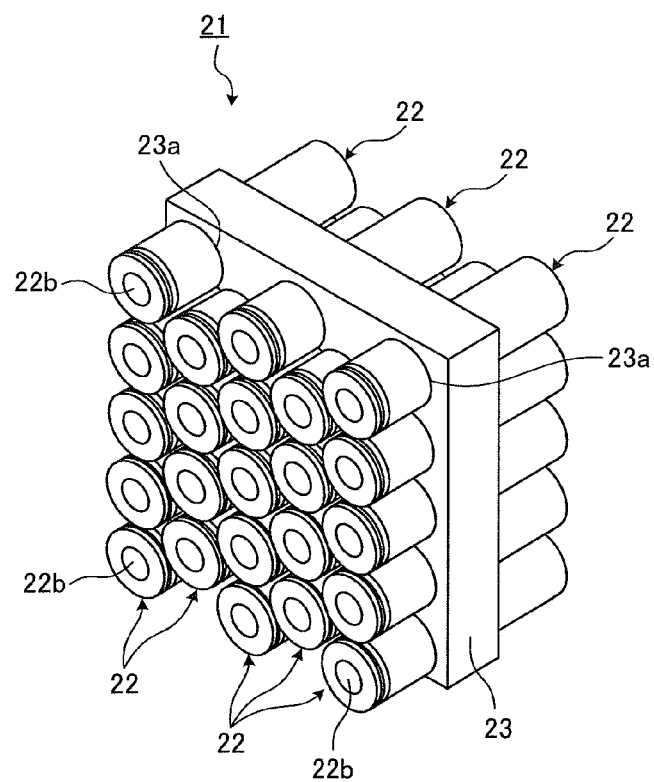
FIG. 5 is an external view of a battery block used in the high-capacity assembled battery.

As shown in FIG. 5, the battery block 21 has the plurality of cells 22 and a holder 23 which holds the plurality of cells 22. The plurality of battery blocks 21 are arranged orderly to constitute the high-capacity assembled battery 20. For mounting the high-capacity assembled battery 20 on the vehicle, the plurality of battery blocks 21 are covered with a case (not shown). Thus, the high-capacity assembled battery 20 is formed of the plurality of battery blocks 21 and the case. The plurality of battery blocks 21 are connected electrically in series through an electrical cable or the like. The high-capacity assembled battery 20 is used to ensure the running distance in the EV running mode, and the many cells 22 are used. As a result, the size of the high-capacity assembled battery 20 tends to be larger than the size of the high-power assembled battery 10.

The holder 23 has through holes 23a each receiving the cell 22 inserted thereinto. The number of the through holes 23a provided is equal to the number of the cells 22 constituting the battery block 21. The plurality of cells 22 are arranged such that the positive electrode terminals 22b (or the negative electrode terminals 22c) are located on the same side of the holder 23. FIG. 5 shows the outer appearance of the battery block 21 when viewed from the side where the positive electrode terminals 22b are arranged. The plurality of positive electrode terminals 22b are connected to a single bus bar, and the plurality of negative electrode terminals 22c are connected to a single bus bar. This provides the electrically parallel connection of the plurality of cells 22.

Although the single holder 23 is used in the battery block 21 of the present embodiment, a plurality of holders 23 may be used. For example, one of the holders 23 can be used to hold the cells 22 closer to the positive electrode terminals 22b, and the other holder 23 can be used to hold the cells 22 closer to the negative electrode terminals 22c.

Air for use in adjusting the temperature of the cell 22 can also be supplied to the high-capacity assembled battery 20. Specifically, when the cell 22 generates heat due to charge and discharge or the like, air for cooling can be supplied to the cell 22 to suppress a rise in temperature of the cell 22. Alternatively, when the cell 22 is excessively cooled due to the external environment or the like, air for heating can be supplied to the cell 22 to suppress a drop in temperature of the cell 22.

Since the cell 22 is the secondary battery, it is more sensitive to temperature than an electric double layer capacitor. The air for cooling or heating can be used to maintain the temperature of the cell 22 within a predefined temperature range to avoid reduced input/output performance of the cell 22. For example, the air in the riding space can be used as the air for adjusting the temperature of the cell 22, similarly to the air for use in adjusting the temperature of the cell 11.

Next, description is made of the characteristics of the cell 11 used in the high-power assembled battery 10 and the characteristics of the cell 22 used in the high-capacity assembled battery 20. Table 1 below shows the comparison between the characteristics of the cells 11 and 22. In Table 1, "high" and "low" represent the relative levels when the two cells 11 and 22 are compared. Specifically, "high" represents a level higher than that of the compared cell, and "low" represents a level lower than that of the compared cell.

TABLE 1

|  | cell 11 (high-power) | cell 22 (high-capacity) |
| --- | --- | --- |
| output density | high | low |
| electric power capacity density | low | high |
| dependence of input/output on temperature | low | high |
| dependence of battery life on temperature | low | high |

The cell 11 has an output density higher than that of the cell 22. The output density of the cells 11 and 22 can be represented, for example, as an electric power per unit mass of the cells 11 and 22 (in W/kg) or an electric power per unit volume of the cells 11 and 22 (in W/L). When the cells 11 and 22 have an equal mass or volume, the output (W) of the cell 11 is higher than the output (W) of the cell 22.

The output density in the electrode component (positive electrode component or negative electrode component) of the cells 11 and 22 can be represented, for example, as a current value per unit area of the electrode component (in $mA/cm^2$). The output density of the electrode component of the cell 11 is higher than that of the cell 22. When the electrode components have an equal area, the value of current capable of flowing through the electrode component of the cell 11 is higher than the value of current capable of flowing through the electrode component of the cell 22.

The cell 22 has an electric power capacity density higher than that of the cell 11. The electric power capacity density of the cells 11 and 22 can be represented, for example, as a capacity per unit mass of the cells 11 and 22 (in Wh/kg) or a capacity per unit volume of the cells 11 and 22 (in Wh/L). When the cells 11 and 22 have an equal mass or volume, the electric power capacity (Wh) of the cell 22 is higher than the electric power capacity (Wh) of the cell 11.

The capacity density in the electrode component (positive electrode component or negative electrode component) of the cells 11 and 22 can be represented, for example, as a capacity per unit mass of the electrode component (in mAh/g) or a capacity per unit volume of the electrode component (in mAh/cc). The capacity density of the electrode component of the cell 22 is higher than that of the cell 11. When the electrode components have an equal mass or volume, the capacity of the electrode component of the cell 22 is higher than the capacity of the electrode component of the cell 11.

Figure 6:
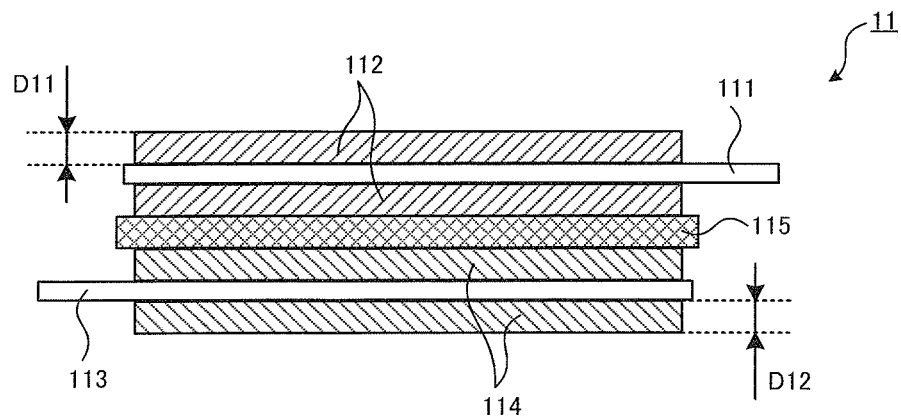
FIG. 6 is a diagram showing the configuration of a power-generating element used in the cell (secondary battery) of the high-power assembled battery.
Figure 7:
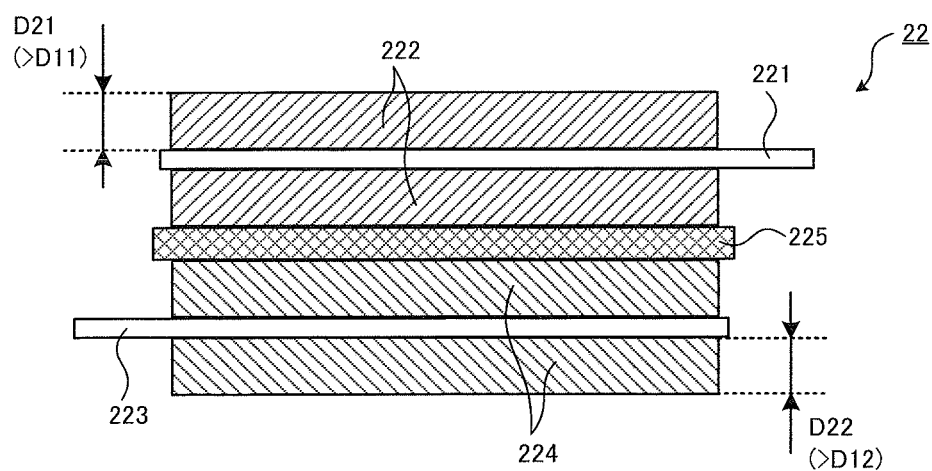
FIG. 7 is a diagram showing the configuration of a power-generating element used in the cell (secondary battery) of the high-capacity assembled battery.

FIG. 6 is a schematic diagram showing the configuration of the power-generating element in the cell 11. FIG. 7 is a schematic diagram showing the configuration of the power-generating element in the cell 22.

In FIG. 6, the positive electrode component forming part of the power-generating element of the cell 11 has a collector plate 111 and a positive electrode active material layer 112 formed on each face of the collector plate 111. When the cell 11 is the lithium-ion secondary battery, aluminum can be used as the material of the collector plate 111, for example. The positive electrode active material layer 112 includes a positive electrode active material, a conductive material, a binder and the like.

The negative electrode component forming part of the power-generating element of the cell 11 has a collector plate 113 and a negative electrode active material layer 114 formed on each face of the collector plate 113. When the cell 11 is the lithium-ion secondary battery, copper can be used as the material of the collector plate 113, for example. The negative electrode active material layer 114 includes a negative electrode active material, a conductive material, a binder and the like.

A separator 115 is arranged between the positive electrode component (positive electrode active material layer 112) and the negative electrode component (negative electrode active material layer 114). The separator 115 is in contact with the positive electrode active material layer 112 and the negative electrode active material layer 114. The positive electrode component, the separator 115, and the negative electrode component are layered as shown in FIG. 6 to constitute a laminate, and the laminate is wound, thereby making it possible to form the power-generating element.

Although the positive electrode active material layer 112 is formed on each face of the collector plate 111 and the negative electrode active material layer 114 is formed on each face of the collector plate 113 in the present embodiment, the present invention is not limited thereto. Specifically, a so-called bipolar electrode can be used. The bipolar electrode has a positive electrode active material layer 112 formed on one face of a collector plate and a negative electrode active material layer 114 formed on the other face of the collector plate. A plurality of such bipolar electrodes are layered with separators interposed between them, so that the power-generating element can be formed.

In FIG. 7, the positive electrode component forming part of the power-generating element of the cell 22 has a collector plate 221 and a positive electrode active material layer 222 formed on each face of the collector plate 221. When the cell 22 is the lithium-ion secondary battery, aluminum can be used as the material of the collector plate 221, for example. The positive electrode active material layer 222 includes a positive electrode active material, a conductive material, a binder and the like.

The negative electrode component forming part of the power-generating element of the cell 22 has a collector plate 223 and a negative electrode active material layer 224 formed on each face of the collector plate 223. When the cell 22 is the lithium-ion secondary battery, copper can be used as the material of the collector plate 223, for example. The negative electrode active material layer 224 includes a negative electrode active material, a conductive material, a binder and the like. A separator 225 is arranged between the positive electrode component (positive electrode active material layer 222) and the negative electrode component (negative electrode active material layer 224). The separator 225 is in contact with the positive electrode active material layer 222 and the negative electrode active material layer 224.

As apparent from FIG. 6 and FIG. 7, a comparison between the positive electrode components in the cell 11 and the cell 22 shows that a thickness D11 of the positive electrode active material layer 112 is smaller than a thickness D21 of the positive electrode active material layer 222. A comparison between the negative electrode components in the cell 11 and the cell 22 shows that a thickness D12 of the negative electrode active material layer 114 is smaller than a thickness D22 of the negative electrode active material layer 224. The thicknesses D11 and D12 of the active material layers 112 and 114 smaller than the thicknesses D21 and D22 of the active material layers 222 and 224 allows the flow of a large current between the positive electrode component and the negative electrode component in the cell 11. Thus, the output density of the cell 11 is higher than the output density of the cell 22.

The volume per unit capacity (in cc/mAh) in the positive electrode active material layer 112 is larger than that of the positive electrode active material layer 222, and the volume per unit capacity in the negative electrode active material layer 114 is larger than that of the negative electrode active material layer 224. The thicknesses D21 and D22 of the active material layers 222 and 224 are larger than the thicknesses D11 and D12 of the active material layers 112 and 114. Consequently, the capacity density of the cell 22 is higher than the capacity density of the cell 11.

Figure 8:
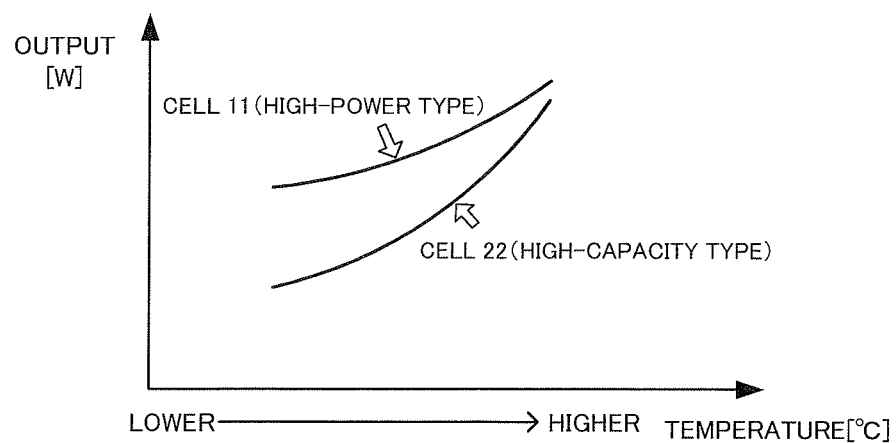
FIG. 8 is a graph showing the relationship between the output of the cell and a temperature.

Next, description is made of the dependence of the battery on temperature. As shown in Table 1, the cell 22 has a higher dependence of input and output on temperature than that of the cell 11. Specifically, the input and output of the cell 22 are more sensitive to temperature changes than the input and output of the cell 11. FIG. 8 shows the output characteristics of the cells 11 and 22 with respect to temperature. In FIG. 8, the horizontal axis represents the temperature and the vertical axis represents the output (electric power). Although FIG. 8 shows the output characteristics of the cells 11 and 22, the input characteristics of the cells 11 and 22 have relationships similar to those shown in FIG. 8.

As shown in FIG. 8, the output performance of each of the cell (high-power) 11 and the cell (high-capacity) 22 is reduced as the temperature drops. The reduction rate of the output performance in the cell 11 is lower than the reduction rate of the output performance in the cell 22. The output performance of the cell 11 is less sensitive to the temperature than the output performance of the cell 22. In other words, the output performance of the cell 22 is more sensitive to the temperature than the output performance of the cell 11.

Figure 9:
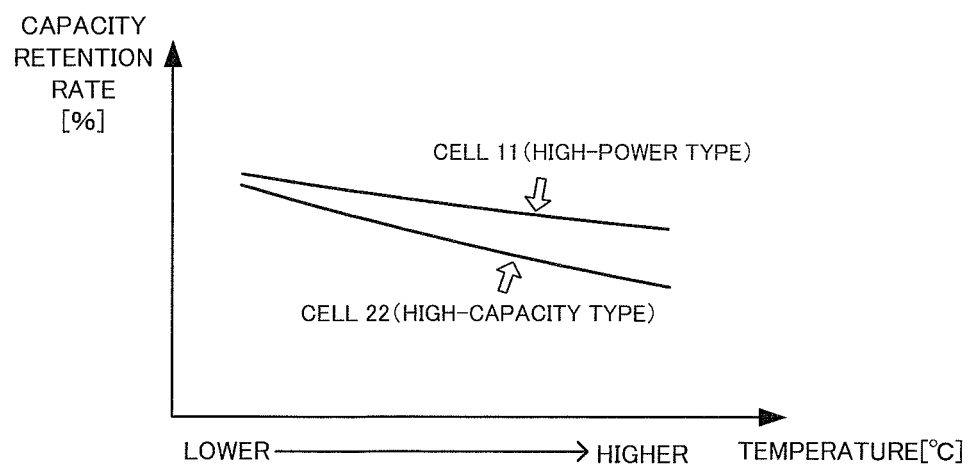
FIG. 9 is a graph showing the relationship between the capacity retention rate of the cell and the temperature.

FIG. 9 is a graph showing the relationship between the capacity retention rate of each of the cells 11 and 22 and temperature. In FIG. 9, the horizontal axis represents the temperature and the vertical axis represents the capacity retention rate. The capacity retention rate is represented by the ratio (deteriorated capacity/initial capacity) between the capacity (initial capacity) of the cells 11 and 22 in an initial state and the capacity (deteriorated capacity) of the cells 11 and 22 in a use state (deteriorated state). The initial state refers to a state in which the cells 11 and 22 are not deteriorated, and for example, a state immediately after the cells 11 and 22 are manufactured. The graph shown in FIG. 9 represents the capacity retention rates of the cells 11 and 22 after the cells are repeatedly charged and discharged at each temperature.

As shown in FIG. 9, the capacity retention rates of the cells 11 and 22 tend to be reduced as the temperature rises. The reduction in the capacity retention rate represents the deterioration of the cells 11 and 22. The reduction rate of the capacity retention rate of the cell 22 with respect to the temperature rise is higher than that of the cell 11. In other words, the cell 22 is deteriorated more significantly than the cell 11 with respect to the temperature rise (temperature change). As described with reference to FIG. 8 and FIG. 9, the high-capacity assembled battery 20 has a higher dependence on temperature than that of the high-power assembled battery 10.

As described with reference to FIG. 6 and FIG. 7, since the high-power assembled battery 10 has the structure in which a larger current flows than in the high-capacity assembled battery 20, the high-power assembled battery 10 can provide the input/output more reliably than the high-capacity assembled battery 20 even when the temperature drops.

The capacity retention rate tends to be reduced due to a reduced amount of reaction material contributing to charge and discharge (for example, lithium ions in the lithium-ion secondary battery). Since the thicknesses D21 and D22 of the active material layers 222 and 224 in the high-capacity assembled battery 20 are larger than the thicknesses D11 and D12 of the active material layers 112 and 114 in the high-power assembled battery 10, the reaction material contributing to charge and discharge in the high-capacity assembled battery 20 tends to have more limited movement than in the high-power assembled battery 10. Thus, the amount of the reaction material contributing charge and discharge is more likely to be reduced, and the capacity retention rate of the high-capacity assembled battery 20 tends to be reduced more than the capacity retention rate of the high-power assembled battery 10.

Figure 10:
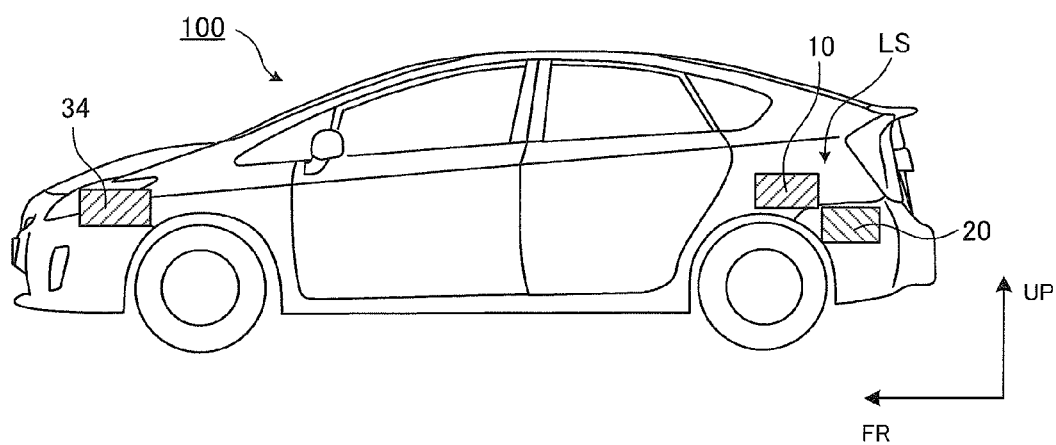
FIG. 10 is a schematic diagram of a vehicle on which the high-power assembled battery and the high-capacity assembled battery are mounted.

Next, description is made of the placement of the high-power assembled battery 10 and the high-capacity assembled battery 20 when they are mounted on the vehicle with reference to FIG. 10. In FIG. 10, a direction indicated by an arrow FR represents a forward direction (front) of the vehicle 100, and a direction indicated by an arrow UP represents an upward direction of the vehicle 100. Obviously, a direction opposite to the direction of the arrow FR represents a rearward direction (rear) of the vehicle 100, and a direction opposite to the direction of the arrow UP represents a downward direction of the vehicle 100.

In the vehicle 100 of the present embodiment, the engine 34 is housed in an engine compartment provided at the front end of the vehicle 100. Specifically, the engine 34 is arranged forward of the space where an occupant rides (referred to as the riding space) in the vehicle 100. It is only required that the engine 34 should be arranged at a position different from positions where the high-power assembled battery 10 and the high-capacity assembled battery 20 are mounted. For example, the engine 34 may be arranged near the center of a vehicle body (midship engine).

In the present embodiment, the high-power assembled battery 10 and the high-capacity assembled battery 20 are placed around a luggage space LS. The luggage space LS refers to a space dedicated to placement of luggage. The luggage space LS may communicate with the riding space or may be separated from the riding space by a partition provided in the vehicle 100. The placement around the luggage space LS means placement at locations along the area which defines the luggage space LS. Thus, the luggage space LS is provided by the space remaining after the placement of the high-power assembled battery 10 and the high-capacity assembled battery 20.

In the present invention, as described above, the high-power assembled battery 10 and the high-capacity assembled battery 20 are arranged around the luggage space LS as a precondition. In other words, the present embodiment does not include a configuration in which at least one of the high-power assembled battery 10 and the high-capacity assembled battery 20 is arranged at a position different from the positions around the luggage space LS. Examples of the position different from the positions around the luggage space LS include the riding space and a space located at an outer face of the vehicle (so-called vehicle exterior space).

Figure 11:
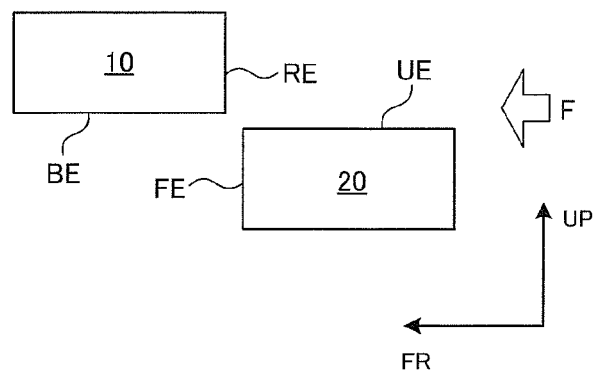
FIG. 11 is a diagram for explaining the positional relationship between the high-power assembled battery and the high-capacity assembled battery.

FIG. 11 is a diagram for explaining the positional relationship between the high-power assembled battery 10 and the high-capacity assembled battery 20. As shown in FIG. 11, the high-power assembled battery 10 is arranged above the high-capacity assembled battery 20 in the vehicle 100. Specifically, a bottom face BE of the high-power assembled battery 10 is located above an upper face UE of the high-capacity assembled battery 20. The bottom face BE of the high-power assembled battery 10 corresponds to a bottom face of the case constituting the exterior of the high-power assembled battery 10. The upper face UE of the high-capacity assembled battery 20 corresponds to an upper face of the case constituting the exterior of the high-capacity assembled battery 20.

The high-capacity assembled battery 20 is arranged rearward of the high-power assembled battery 10 in the vehicle 100. Specifically, a front end FE of the high-capacity assembled battery 20 is located rearward of a rear end RE of the high-power assembled battery 10 in the vehicle 100. The front end FE of the high-capacity assembled battery 20 corresponds to a foremost face of the case constituting the exterior of the high-capacity assembled battery 20 in the vehicle 100. The rear end RE of the high-power assembled battery 10 corresponds to a rearmost face of the case constituting the exterior of the high-power assembled battery 10 in the vehicle 100.

Although the front end FE of the high-capacity assembled battery 20 is located rearward of the rear end RE of the high-power assembled battery 10 in vehicle 100 in the configuration shown in FIG. 11, the present invention is not limited thereto. For example, the front end FE of the high-capacity assembled battery 20 and the rear end RE of the high-power assembled battery 10 may be aligned in an up-down direction of the vehicle 100. In other words, the high-power assembled battery 10 and the high-capacity assembled battery 20 may be arranged such that the front end FE and the rear end RE coincide when viewed from above or below the vehicle 100.

The high-capacity assembled battery 20 and the high-power assembled battery 10 can be arranged such that at least part of the high-capacity assembled battery 20 protrudes from the high-power assembled battery 10 rearward in the vehicle 100. For example, the high-power assembled battery 10 and the high-capacity assembled battery 20 can be arranged as shown in FIG. 12.

Figure 12:
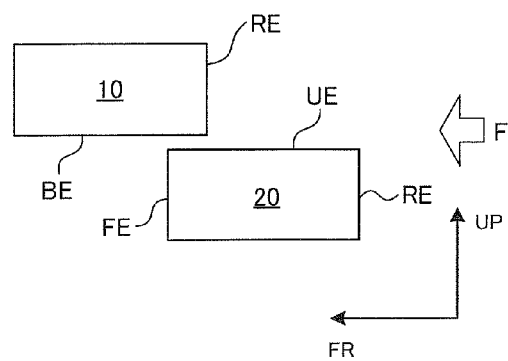
FIG. 12 is a diagram for explaining the positional relationship (in a modification) between the high-power assembled battery and the high-capacity assembled battery.

In the configuration shown in FIG. 12, the front end FE of the high-capacity assembled battery 20 is located forward of the rear end RE of the high-power assembled battery 10 in the vehicle 100. The rear end RE of the high-power assembled battery 10 is located forward of a rear end RE of the high-capacity assembled battery 20 in the vehicle 100. The part of the high-capacity assembled battery 20 and the part of the high-power assembled battery 10 overlap each other when viewed above or below the vehicle 100. In the configuration shown in FIG. 12, the high-power assembled battery 10 is arranged above the high-capacity assembled battery 20 in the vehicle 100 similarly to the configuration shown in FIG. 11.

For placing the high-power assembled battery 10 above the high-capacity assembled battery 20 in the vehicle 100, the positions of the high-power assembled battery 10 and the high-capacity assembled battery 20 in the up-down direction of the vehicle 100 can be set as appropriate. Specifically, the positions of the high-power assembled battery 10 and the high-capacity assembled battery 20 can be set as appropriate suitably for the structure of the vehicle body on which the high-power assembled battery 10 and the high-capacity assembled battery 20 are mounted. The positions of the high-power assembled battery 10 and the high-capacity assembled battery 20 in a front-rear direction of the vehicle 100 can also be set as appropriate in view of the structure of the vehicle body or the like.

Figure 13:
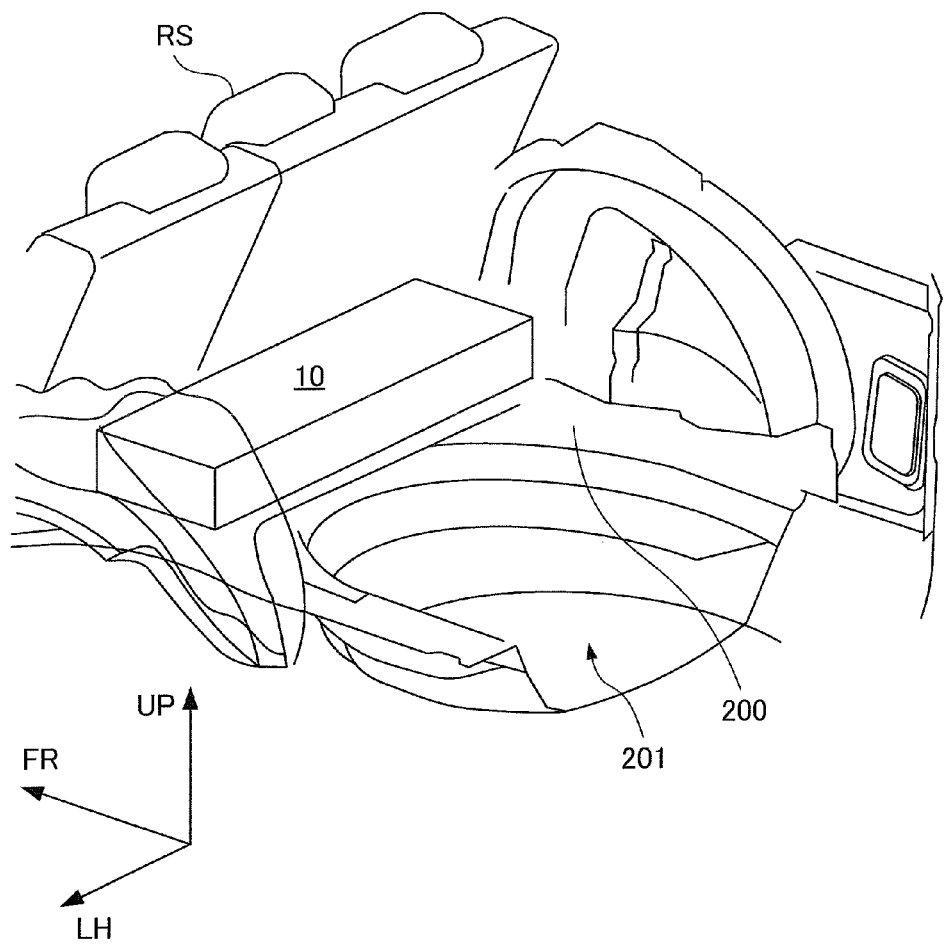
FIG. 13 is a diagram showing the structure around a luggage space.

With reference to FIG. 13, description is made of an example of the placement of the high-power assembled battery 10 and the high-capacity assembled battery 20 in the positional relationships shown in FIG. 11 and FIG. 12. FIG. 13 is a diagram showing the structure around the luggage space. An arrow LH shown in FIG. 13 indicates a left direction when facing the direction of the arrow FR.

As shown in FIG. 13, the high-power assembled battery 10 is arranged along a back face of a rear seat RS. The high-power assembled battery 10 can be attached to a floor panel (part of the vehicle body) 200 to which the rear seat RS is fixed. The floor panel 200 has a recessed portion 201 which is located rearward of the high-power assembled battery 10 in the vehicle 100. A spare tire can be housed in the recessed portion 201 when the vehicle 100 is a conventional one.

The high-capacity assembled battery 20 can be housed in the recessed portion 201 of the floor panel 200. The placement of the high-capacity assembled battery 20 in the recessed portion 201 of the floor panel 200 assists in the allocation of the luggage space LS provided above the recessed portion 201. Specifically, if the high-capacity assembled battery 20 is arranged above the recessed portion 201, the luggage space LS is limited and narrowed by the high-capacity assembled battery 20. The high-capacity assembled battery 20 housed in the recessed portion 201 as in the present embodiment can increase the size of the luggage space LS.

Since the high-power assembled battery 10 is arranged at an upper end of the recessed portion 201, the entire high-capacity assembled battery 20 is preferably housed in the space surrounded by the recessed portion 201 in order to achieve the positional relationships shown in FIG. 11 and FIG. 12. As described with reference to FIG. 2 and FIG. 4, the size of the cell (cylinder-type cell) 22 is smaller than the size of the cell (square-type cell) 11, so that the layout of the cells 22 is designed more freely than that of the cells 11. This facilitates the placement of the high-capacity assembled battery 20 in the recessed portion 201.

The shape of the recessed portion 201 is not limited to the shape shown in FIG. 13 and can be set as appropriate to fit to the outer shape of the high-capacity assembled battery 20 housed in the recessed portion 201. In other words, the shape of the recessed portion 201 can be set as appropriate to smoothly accommodate the high-capacity assembled battery 20.

The positions to arrange the high-power assembled battery 10 and the high-capacity assembled battery 20 are not limited to those shown in FIG. 13. For example, when the floor panel 200 is not provided with the recessed portion 201 and is formed of a flat surface, a bracket can be attached to the high-power assembled battery 10 to arrange the high-power assembled battery 10 above the high-capacity assembled battery 20 in the vehicle 100. In this case, it is necessary that at least part of the high-capacity assembled battery 20 should protrude from the high-power assembled battery 10 rearward in the vehicle 100.

When a rearward portion of the vehicle 100 (closer to a rear bumper) collides, an external force indicated by an arrow F in each of FIG. 11 and FIG. 12 occurs. The external force F is directed toward the front of the vehicle 100. As described with reference to FIG. 11 and FIG. 12, at least part of the high-capacity assembled battery 20 protrudes from the rear end RE of the high-power assembled battery 10 rearward in the vehicle 100, so that the external force F tends to act on the high-capacity assembled battery 20 rather than the high-power assembled battery 10. Upon collision of the rearward portion of the vehicle 100, the external force F can be absorbed by deformation of the rear bumper or the vehicle body. However, the external force F may act on the high-capacity assembled battery 20 depending on the magnitude of the external force F.

When the external force F acts on the high-capacity assembled battery 20, charge and discharge of the high-capacity assembled battery 20 are preferably limited. The limitation of the charge and discharge of the high-capacity assembled battery 20 can be performed by reducing an upper limit value to which the charge and discharge are allowed or by inhibiting the charge and discharge. The upper limit value to which the charge and discharge are allowed is used in controlling the charge and discharge of the high-capacity assembled battery 20. The charge and discharge of the high-capacity assembled battery 20 are controlled such that the input electric power and the output electric power of the high-capacity assembled battery 20 do not exceed the upper limit value. Once the upper limit value is reduced, the input electric power and the output electric power of the high-capacity assembled battery 20 can be reduced to limit the use of the high-capacity assembled battery 20 on which the external force F acted.

When the external force F acts on the high-capacity assembled battery 20, the external force F can be absorbed by the deformation of the high-capacity assembled battery 20 or the like to prevent the action of the external force F on the high-power assembled battery 10.

The prevention of the action of the external force F on the high-power assembled battery 10, that is, the prevention of deformation of the high-power assembled battery 10 due to the external force F, allows the high-power assembled battery 10 to be used continuously. Specifically, the output from the high-power assembled battery 10 can be used to run the vehicle 100, or the regenerative electric power produced in braking of the vehicle 100 can be stored in the high-power assembled battery 10.

When the external force F acts on the high-capacity assembled battery 20, the high-capacity assembled battery 20 may be displaced toward the front of the vehicle 100. To address this, the high-capacity assembled battery 20 is displaced intentionally toward the front of the vehicle 100 when the external force F acts on the high-capacity assembled battery 20, thereby making it possible to protect the cells 22 constituting the high-capacity assembled battery 20. Although the case constituting the exterior of the high-capacity assembled battery 20 may be deformed by the external force F, an excessive load on the cells 22 can be prevented by displacing the cells 22 toward the front of the vehicle 100.

The external force F may be absorbed during the displacement of the high-capacity assembled battery 20 toward the front of the vehicle 100. For displacing the high-capacity assembled battery 20 toward the front of the vehicle 100, it is necessary to deform the portion of the high-capacity assembled battery 20 fastened to the vehicle body. The deformation of the fastening portion can absorb the external force F.

In the present embodiment, as described in FIG. 11 and FIG. 12, the high-power assembled battery 10 is arranged above the high-capacity assembled battery 20 in the vehicle 100. In other words, the high-power assembled battery 10 and the high-capacity assembled battery 20 do not overlap with each other when viewed from the front or rear of the vehicle 100. Even when the high-capacity assembled battery 20 is displaced toward the front of the vehicle 100, the high-capacity assembled battery 20 does not collide with the high-power assembled battery 10. The external force F can be prevented from being transferred to the high-power assembled battery 10 through the high-capacity assembled battery 20.

For arranging the high-power assembled battery 10 and the high-capacity assembled battery 20 around the same space (luggage space LS), the layout for protecting the high-power assembled battery 10 from the external force F is required. The placement of the high-power assembled battery 10 and the high-capacity assembled battery 20 as described in the present embodiment can facilitate the protection of the high-power assembled battery 10.

Assuming that one of the high-power assembled battery 10 and the high-capacity assembled battery 20 is unusable, it is preferable that the high-power assembled battery 10 should continue to be used and the high-capacity assembled battery 20 should be unusable in order to achieve the running performance of the vehicle 100.

When the high-power assembled battery 10 can continue to be used, the running in the HV running mode can be performed, for example. Since the high-power assembled battery 10 can be charged and discharged with a current larger than a current capable of flowing through the high-capacity assembled battery 20, the high-power assembled battery 10 is better than the high-capacity assembled battery 20 in that the former can ensure instantaneous input/output performance. Through the use of the high-power assembled battery 10 in the HV running mode, the required output can be provided in accordance with the pressing of the accelerator pedal to prevent reduced running performance of the vehicle 100. Depending on the SOC of the high-power assembled battery 10, the running in the EV running mode can also be performed.

As described with reference to FIG. 8, the electric power during the charge and discharge of the high-power assembled battery 10 (cell 11) is higher than the electric power during the charge and discharge of the high-capacity assembled battery 20 (cell 22). When the cells 11 and 22 have an equal temperature, the electric power during the charge and discharge of the cell 11 is higher than the electric power during the charge and discharge of the cell 22. Thus, when the high-power assembled battery 10 is used, the running of the vehicle 100 can be performed and the regenerative electric power can be stored more reliably than when the high-capacity assembled battery 20 is used.

As shown in FIG. 8, since the outputs from the high-capacity assembled battery 20 and the high-power assembled battery 10 are reduced as the temperature drops, the use of the high-power assembled battery 10 is preferable in order to perform the running of the vehicle 100 reliably under a low-temperature environment. In other words, the use of the high-power assembled battery 10 easily satisfies the required output of the vehicle 100 in the low-temperature environment. When only the high-capacity assembled battery 20 is usable, it is difficult to satisfy the required output of the vehicle 100 in the low-temperature environment.

For starting the engine 34 with the output from the high-power assembled battery 10, the protection of the high-power assembled battery 10 is also necessary in terms of starting the engine 34 without fail. The start of the engine 34 requires an electric power equal to or higher than a predetermined electric power. The electric powers output from the high-power assembled battery 10 and the high-capacity assembled battery 20 are reduced as the temperature drops, but the electric power output from the high-power assembled battery 10 is higher than the electric power output from the high-capacity assembled battery 20. In other words, the electric power output from the high-power assembled battery 10 is higher than the electric power output from the high-capacity assembled battery 20 in the low-temperature environment. To start the engine 34 without fail in the low-temperature environment, the use of the high-power assembled battery 10 is preferable to the use of the high-capacity assembled battery 20.

In starting the engine 34 with the high-capacity assembled battery 20, a problem described below may occur. Since the electric power output from the high-capacity assembled battery 20 is lower than the electric power output from the high-power assembled battery 10, the engine 34 may not be able to be started again after the engine 34 is stopped, when trying to start the engine 34 with the high-capacity assembled battery 20. A possible solution to such a problem is not to stop the engine 34. If the engine 34 is continuously driven without being stopped, however, the fuel economy is reduced. Consequently, to start the engine 34 without fail and to prevent the reduced fuel economy, the use of the high-power assembled battery 10 is preferable to the use of the high-capacity assembled battery 20.

To store the sufficient regenerative electric power produced in braking of the vehicle 100 in the low-temperature environment, the use of the high-power assembled battery 10 is preferable. The use of the high-power assembled battery 10 allows the efficient storage of the regenerative electric power even in the low-temperature environment. If only the high-capacity assembled battery 20 is usable, only part of the regenerative electric power may be stored in the low-temperature environment, and sufficient regenerative electric power may not be stored.

As described in FIG. 8 and FIG. 9, the high-capacity assembled battery 20 has a higher dependence on temperature than that of the high-power assembled battery 10. For this reason, the high-power assembled battery 10 having a lower dependence on temperature than that of the high-capacity assembled battery 20 can be protected to provide a condition less affected by the temperature in which the high-power assembled battery 10 can be used continuously.

Specifically, the progression of the deterioration of the high-power assembled battery 10 can be delayed as compared with the progression of the deterioration of the high-capacity assembled battery 20. If only the high-capacity assembled battery 20 is left usable after the rearward portion of the vehicle 100 collides, the high-capacity assembled battery 20 is more affected by temperature and this situation is not preferable in order to reliably perform the running of the vehicle 100. The deterioration of the high-capacity assembled battery 20 may tend to proceed when only the high-capacity assembled battery 20 is left.

The high-capacity assembled battery 20 is used mainly for ensuring the running distance of the vehicle 100 and for achieving the running in the EV running mode. After the vehicle 100 collides, the achievement of the running performance is preferable to the achievement of the running distance and the running in the EV running mode.

As described with reference to FIG. 1, the vehicle 100 of the present embodiment can be run with the engine 34. Since the engine 34 is arranged in the engine compartment provided at the front end of the vehicle 100, the engine 34 does not break down even when the rearward portion of the vehicle 100 collides. The engine 34 is arranged at the position different from the positions where the high-power assembled battery 10 and the high-capacity assembled battery 20 are mounted, so that the engine 34 does not break down even when the rearward portion of the vehicle 100 collides. Thus, after the collision of the rearward portion of the vehicle 100, the vehicle 100 can be run with the engine 34.

In the vehicle 100 which can be run with the engine 34, if only the high-capacity assembled battery 20 is left usable after the collision of the rearward portion of the vehicle 100, the use of the high-capacity assembled battery 20 does not provide significant advantages. Since the engine 34 can be used to run the vehicle 100, it is less necessary to run the vehicle 100 with the high-capacity assembled battery 20. Since the high-capacity assembled battery 20 is used for ensuring the running distance of the vehicle 100 or for reliably performing the running in the EV running mode, the high-capacity assembled battery 20, in particular, is less necessary when the engine 34 can be used to run the vehicle 100.

In contrast, only the high-power assembled battery 10 is left usable after the collision of the rearward portion of the vehicle 100 in the present embodiment, so that the vehicle 100 can be run by using the engine 34 and the high-power assembled battery 10 in combination. The use of the high-power assembled battery 10 can ensure the instantaneous input/output to enhance the running performance of the vehicle 100.

As described above, after the collision of the rearward portion of the vehicle 100, the protection of the high-power assembled battery 10 is preferable to the protection of the high-capacity assembled battery 20. In the present embodiment, the placement of the high-power assembled battery 10 and the high-capacity assembled battery 20 as described in FIG. 11 and FIG. 12 allows the protection of the high-power assembled battery 10 with a higher priority when the rearward portion of the vehicle 100 collides.

Depending on the point of the collision in the rearward portion of the vehicle 100, the external force F may act on the vehicle 100 above the high-capacity assembled battery 20. For example, when a vehicle having a great height collides with the rearward portion of the vehicle 100, a portion of the vehicle 100 that is located above the high-capacity assembled battery 20 may be deformed. In this case, the external force F does not act properly on the high-capacity assembled battery 20.

The high-power assembled battery 10 is arranged above the high-capacity assembled battery 20 in the vehicle 100 and is arranged forward of the high-capacity assembled battery 20 in the vehicle 100. In other words, the high-power assembled battery 10 is arranged at some distance from the rearward portion of the vehicle 100. Even when the external force F acts on the portion of the vehicle 100 located above the high-capacity assembled battery 20, the external force F can be prevented from directly reaching the high-power assembled battery 10. This can protect both the high-capacity assembled battery 20 and the high-power assembled battery 10.

It is also possible that two high-power assembled batteries 10 (two assembled batteries having the same configuration) can be arranged around the luggage space LS. In other words, it is possible that the high-power assembled battery 10 can be used instead of the high-capacity assembled battery 20 in the configuration of the present embodiment. In this case, even when the external force F deforms one of the high-power assembled batteries 10, the other high-power assembled battery 10 can be used to run the vehicle 100. When the two high-power assembled batteries 10 are used, however, it is difficult to ensure the running distance and the running performance simultaneously when no collision of the vehicle 10 occurs.

Figure 14:
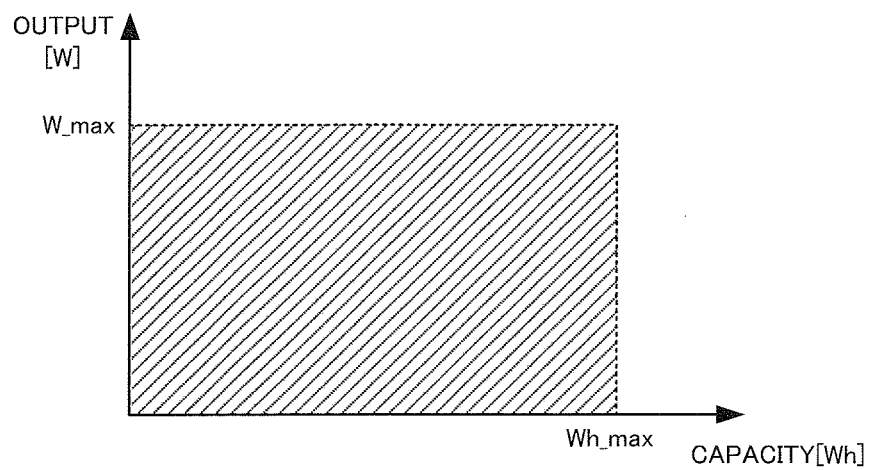
FIG. 14 is a graph showing the relationship between an output (running performance) and a capacity (running distance).

In a coordinate system shown in FIG. 14, the vertical axis represents the output and the horizontal axis represents the capacity. The output influences the running performance of the vehicle, and the capacity influences the running distance of the vehicle. As shown in FIG. 14, when the output and the capacity can be provided in an area (hatched area) surrounded by a maximum output W max and a maximum capacity Wh_max, the performance required of each vehicle (running distance and running performance) can be satisfied.

The high-power assembled battery 10 and the high-capacity assembled battery 20 can be combined to have a relationship between an arbitrary output and an arbitrary capacity included in the hatched area shown in FIG. 14. Specifically, the driving of the high-power assembled battery 10 and the high-capacity assembled battery 20 can be controlled to cover the entire hatched area shown in FIG. 14.

For example, the high-capacity assembled battery 20 can be used to change the capacity (running distance) up to the maximum capacity Wh_max. The high-power assembled battery 10 can be used to change the output (running performance) up to the maximum output W max. In this manner, each of the capacity (running distance) and the output (running performance) can be changed to cover the entire hatched area shown in FIG. 14.

When the two high-power assembled batteries 10 are used, the output (running performance) can be achieved but the capacity (running distance) is difficult to achieve, and only part of the hatched area shown in FIG. 14 can be covered. When the capacity (running distance) is difficult to achieve, the performance required of the vehicle (especially, the running distance) is not sufficiently satisfied, with the result that the commercial value of the vehicle may be reduced. Therefore, both the high-power assembled battery 10 and the high-capacity assembled battery 20 are preferably mounted on the vehicle as in the present embodiment in order to increase the commercial value of the vehicle.

Next, a modification of the present embodiment is described. Although the high-power assembled battery 10 and the high-capacity assembled battery 20 are arranged as shown in FIG. 11 or FIG. 12 in the present embodiment, they may be arranged as shown in FIG. 15.

Figure 15:
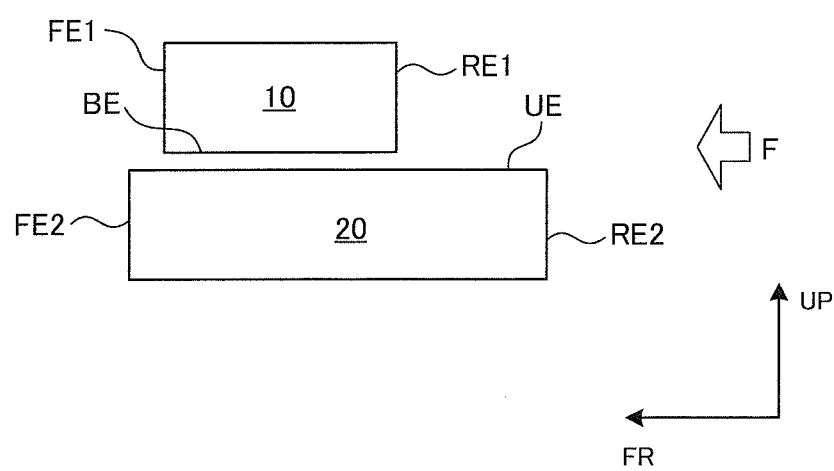
FIG. 15 is a diagram for explaining the positional relationship (in a modification) between the high-power assembled battery and the high-capacity assembled battery.

In FIG. 15, a front end FE2 of the high-capacity assembled battery 20 is located forward of a front end FE1 of the high-power assembled battery 10 in the vehicle 100. As described in the present embodiment, the front ends FE1 and FE2 are foremost faces of the cases constituting the exteriors of the assembled batteries 10 and 20 in the vehicle 100, respectively. A rear end RE2 of the high-capacity assembled battery 20 is located rearward of a rear end RE1 of the high-power assembled battery 10 in the vehicle 100. Thus, as in the present embodiment, part of the high-capacity assembled battery 20 protrudes from the high-power assembled battery 10 rearward in the vehicle 100. As described in the present embodiment, the rear ends RE1 and RE2 are rearmost faces of the cases constituting the exteriors of the assembled batteries 10 and 20 in the vehicle 100, respectively.

Similarly to the present embodiment, the high-power assembled battery 10 is located above the high-capacity assembled battery 20 in the vehicle 100. Specifically, the bottom face BE of the high-power assembled battery 10 is located above the upper face UE of the high-capacity assembled battery 20 in the vehicle 100. The entire bottom face BE of the high-power assembled battery 10 is opposite to the upper face UE of the high-capacity assembled battery 20 in the up-down direction of the vehicle 100.

In the configuration shown in FIG. 15, since the high-capacity assembled battery 20 protrudes from the high-power assembled battery 10 rearward in the vehicle 100, the external force F occurring upon collision of the rearward portion of the vehicle 100 may act on the high-capacity assembled battery 20. Typically, the vehicle body is designed such that the external force F can be absorbed by deformation of the vehicle body or the like before the external force F reaches the high-capacity assembled battery 20. When the external force F is more than expected, however, the external force F may act on the high-capacity assembled battery 20.

In the configuration shown in FIG. 15, since the rear end RE1 of the high-power assembled battery 10 is located forward of the rear end RE2 of the high-capacity assembled battery 20 in the vehicle 100, the action of the external force F on the high-power assembled battery 10 can be prevented. The high-capacity assembled battery 20 can absorb the external force F to prevent the action of the external force F on the high-power assembled battery 10. Since the high-power assembled battery 10 is located above the high-capacity assembled battery 20 in the vehicle 100, the high-capacity assembled battery 20 does not collide with the high-power assembled battery 10 even when the external force F is applied to and displaces the high-capacity assembled battery 20 forward in the vehicle 100.

The configuration shown in FIG. 15 can provide the same effects as those in the present embodiment. Since the front end FE2 of the high-capacity assembled battery 20 is located forward of the front end FE1 of the high-power assembled battery 10 in the vehicle 100 in the configuration shown in FIG. 15, the high-capacity assembled battery 20 can be increased in size as compared with the configurations shown in FIG. 11 and FIG. 12. Specifically, the number of the cells 22 constituting the high-capacity assembled battery 20 can be increased to increase the capacity of the high-capacity assembled battery 20. The increased capacity of the high-capacity assembled battery 20 can extend the running distance of the vehicle 100.

For starting charge and discharge of the assembled batteries 10 and 20, it is necessary to operate the system main relays SMR-B1, SMR-B2, SMR-G1, and SMR-G2 provided for the assembled batteries 10 and 20. In each of the system main relays SMR-B1, SMR-B2, SMR-G1, and SMR-G2, current is passed through a coil to produce a magnetic force which is then used to switch the relay from OFF to ON. At the switching of the system main relays SMR-B1, SMR-B2, SMR-G1, and SMR-G2 from OFF to ON, an abnormal sound may occur. The system main relays SMR-B1 and SMR-G1 are arranged adjacently to the high-power assembled battery 10, and the system main relays SMR-B2 and SMR-G2 are arranged adjacently to the high-capacity assembled battery 20.

Since the high-power assembled battery 10 is arranged above the high-capacity assembled battery 20 in the configuration shown in FIG. 15, the abnormal sound produced in operating the system main relays SMR-B2 and SMR-G2 for the high-capacity assembled battery 20 can be prevented from reaching the occupant present in the riding space. Specifically, the abnormal sound produced in the high-capacity assembled battery 20 and traveling toward the riding space can be blocked by the high-power assembled battery 10. In the EV running mode, since the high-capacity assembled battery 20 is used preferentially, the abnormal sound often occurs from the high-capacity assembled battery 20. The configuration shown in FIG. 15 can be used to prevent the abnormal sound from reaching the riding space from the high-capacity assembled battery 20 to avoid making the occupant present in the riding space feel uncomfortable.

A blower placed in each of the high-power assembled battery 10 and the high-capacity assembled battery 20 can be driven to supply air for temperature adjustment to each of the high-power assembled battery 10 and the high-capacity assembled battery 20. When the blower is driven, the driving sound of the blower may reach the occupant present in the riding space. Since the high-power assembled battery 10 is arranged above the high-capacity assembled battery 20 in the configuration shown in FIG. 15, the high-power assembled battery 10 can prevent the driving sound of the blower provided for the high-capacity assembled battery 20 from reaching the riding space.

The high-capacity assembled battery 20 is used preferentially in the EV running mode. The engine 34 is not operated and silence is required in the EV running mode than in the HV running mode. Since the driving sound of the blower provided for the high-capacity assembled battery 20 can be prevented from reaching the riding space in the configuration shown in FIG. 15, the silence can be achieved in the EV running mode.

When the assembled batteries 10 and 20 are charged or discharged, the assembled batteries 10 and 20 may produce electromagnetic waves. Since the high-power assembled battery 10 is located above the high-capacity assembled battery 20 in the configuration shown in FIG. 15, the high-power assembled battery 10 can block the electromagnetic waves produced in the high-capacity assembled battery 20 and traveling toward the riding space. Since the high-capacity assembled battery 20 is used preferentially in the EV running mode, the high-capacity assembled battery 20 tends to produce the electromagnetic waves during running in the EV running mode.

In the configuration shown in FIG. 15, the electromagnetic waves traveling from the high-capacity assembled battery 20 toward the riding space can be suppressed in the EV running mode. When a radio or a television is used in the riding space, the electromagnetic waves are likely to produce noise. However, the suppression of the electromagnetic waves can reduce the production of noise.

Although the front end FE2 of the high-capacity assembled battery 20 is located forward of the front end FE1 of the high-power assembled battery 10 in the vehicle 100 in the configuration shown in FIG. 15, the present invention is not limited thereto. For example, the front end FE1 of the high-power assembled battery 10 and the front end FE2 of the high-capacity assembled battery 20 may be aligned in the up-down direction of the vehicle 100. This configuration can provide the same effects as those of the configuration shown in FIG. 15.

It is only required that the high-power assembled battery 10 and the high-capacity assembled battery 20 should have the positional relationship shown in FIG. 15, and the particular positions to arrange the high-power assembled battery 10 and the high-capacity assembled battery 20 can be set as appropriate. For example, the high-power assembled battery 10 and the high-capacity assembled battery 20 can be arranged along the back face of the rear seat. Typically, the rear seat is inclined such that an upper portion of the rear seat is located rearward of a lower portion of the rear seat in the vehicle 100. Thus, according to the arrangement shown in FIG. 15, the high-power assembled battery 10 and the high-capacity assembled battery 20 can be arranged along the back face of the rear seat.

Figure 16:
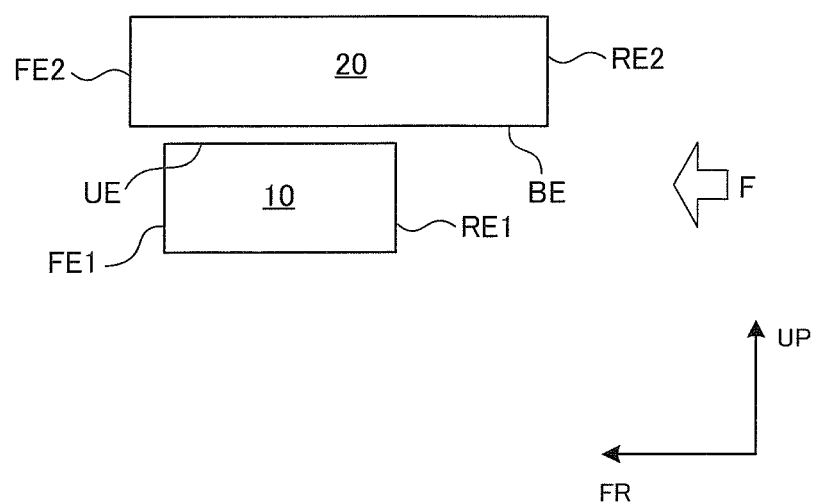
FIG. 16 is a diagram for explaining the positional relationship (in a modification) between the high-power assembled battery and the high-capacity assembled battery.

Alternatively, the high-power assembled battery 10 and the high-capacity assembled battery 20 may be arranged as shown in FIG. 16. In the configuration shown in FIG. 16, the high-capacity assembled battery 20 is arranged above the high-power assembled battery 10 in the vehicle 100. Specifically, a bottom face BE of the high-capacity assembled battery 20 is located above an upper face UE of the high-power assembled battery 10 in the vehicle 100.

The rear end RE2 of the high-capacity assembled battery 20 is located rearward of the rear end RE1 of the high-power assembled battery 10 in the vehicle 100. In other words, part of the high-capacity assembled battery 20 protrudes from the high-power assembled battery 10 rearward in the vehicle 100. Although the front end FE2 of the high capacity assembled battery 20 is located forward of the front end FE1 of the high-power assembled battery 10 in the vehicle 100 in the configuration shown in FIG. 16, the front ends FE1 and FE2 may be aligned in the up-down direction of the vehicle 100.

In the configuration shown in FIG. 16, the external force F occurring upon collision of the rearward portion of the vehicle 100 tends to act on the high-capacity assembled battery 20 rather than the high-power assembled battery 10. Similarly to the embodiment described above, the high-power assembled battery 10 can be protected when the external force F occurs.

In the configuration shown in FIG. 16, the space located rearward of the high-power assembled battery 10 in the vehicle 100 and located below the high-capacity assembled battery 20 in the vehicle 100 is often a dead space. Components for use in controlling charge and discharge of the assembled batteries 10 and 20 can be arranged in the dead space. Example of the components include the system main relays SMR-B1, SMR-B2, SMR-G1, and SMR-G2, a monitor unit for monitoring the voltages of the assembled batteries 10 and 20, and a current sensor for detecting the currents of the assembled batteries 10 and 20. Such components can be arranged to use the dead space efficiently.

The invention claimed is:

1. A vehicle comprising:
a motor serving as a driving source configured to run the vehicle; and
a high-power assembled battery and a high-capacity assembled battery, each of the high-power assembled battery and the high-capacity assembled battery including a plurality of secondary batteries and being configured to supply an electric power to the motor, the plurality of secondary batteries of the high-power assembled battery and the plurality of secondary batteries of the high-capacity assembled battery being housed in different cases, the high-power assembled battery and the high-capacity assembled battery being arranged around a luggage space located in a rearward portion of the vehicle,
wherein the high-power assembled battery is chargeable and dischargeable with a current larger than a current during charge and discharge of the high-capacity assembled battery, and
the high-capacity assembled battery has an energy capacity larger than an energy capacity of the high-power assembled battery and is arranged above or below the high-power assembled battery in the vehicle, and at least a portion of the high-capacity assembled battery protrudes from the high-power assembled battery rearward in the vehicle.

2. The vehicle according to claim 1, wherein, when the high-power assembled battery and the high-capacity assembled battery have an equal temperature, an electric power during charge and discharge of the high-power assembled battery is higher than an electric power during charge and discharge of the high-capacity assembled battery.

3. The vehicle according to claim 1, further comprising an engine serving as a driving source configured to run the vehicle,
wherein the high-power assembled battery supplies an electric power to the motor in accordance with an output required of the vehicle while the vehicle is run with the engine or the high-capacity assembled battery, and
the high-capacity assembled battery supplies an electric power to the motor to run the vehicle while the engine is not operated.

4. The vehicle according to claim 1, wherein the high-capacity assembled battery is arranged below and rearward of the high-power assembled battery in the vehicle.

5. The vehicle according to claim 4, wherein the high-power assembled battery is arranged at a position along a back face of a seat adjacent to the luggage space on a floor panel of the vehicle, and
the high-capacity assembled battery is arranged in a recessed portion located below the luggage space and formed in the floor panel.

6. The vehicle according to claim 1, wherein a whole bottom face of the high-power assembled battery is opposite to an upper face of the high-capacity assembled battery in an up-down direction of the vehicle.

7. The vehicle according to claim 1, wherein the high-power assembled battery has the plurality of secondary batteries connected electrically in series, and
the high-capacity assembled battery has the plurality of secondary batteries connected electrically in parallel.

8. The vehicle according to claim 7, wherein the secondary battery of the high-power assembled battery has a square shape, and
the secondary battery of the high-capacity assembled battery has a cylindrical shape.

* * * * *